United States Patent
Klein et al.

(10) Patent No.: US 10,078,614 B2
(45) Date of Patent: Sep. 18, 2018

(54) SYSTEMS AND METHODS OF DATA TRANSFER

(71) Applicant: SANDISK TECHNOLOGIES INC., Plano, TX (US)

(72) Inventors: Eliad Adi Klein, Sunnyvale, CA (US); Rotem Sela, Haifa (IL); Miki Sapir, Nes Ziona (IL)

(73) Assignee: SANDISK TECHNOLOGIES LLC, Addison, TX (US)

( * ) Notice: Subject to any disclaimer, the term of this patent is extended or adjusted under 35 U.S.C. 154(b) by 420 days.

(21) Appl. No.: 14/857,136

(22) Filed: Sep. 17, 2015

(65) Prior Publication Data
US 2017/0046300 A1 Feb. 16, 2017

Related U.S. Application Data

(60) Provisional application No. 62/203,365, filed on Aug. 10, 2015.

(51) Int. Cl.
*G06F 13/42* (2006.01)
*G06F 13/16* (2006.01)

(52) U.S. Cl.
CPC ...... *G06F 13/4282* (2013.01); *G06F 13/1668* (2013.01); *Y02D 10/14* (2018.01); *Y02D 10/151* (2018.01)

(58) Field of Classification Search
CPC ................. G06F 13/4282; G06F 13/1668
USPC ..................................................... 710/313
See application file for complete search history.

(56) References Cited

U.S. PATENT DOCUMENTS

| | | | |
|---|---|---|---|
| 6,647,431 B1 * | 11/2003 | Utas | G06F 9/4812 719/313 |
| 7,457,897 B1 | 11/2008 | Lee et al. | |
| 7,801,561 B2 | 9/2010 | Parikh et al. | |
| 7,934,055 B2 | 4/2011 | Flynn et al. | |
| 8,966,172 B2 | 2/2015 | Malwankar | |
| 2005/0223171 A1 * | 10/2005 | Kanai | G06F 3/061 711/114 |
| 2007/0079365 A1 * | 4/2007 | Ito | H04L 63/20 726/11 |
| 2009/0100280 A1 | 4/2009 | Lindsay | |
| 2013/0152086 A1 * | 6/2013 | Yoo | G06F 9/455 718/1 |
| 2013/0343250 A1 | 12/2013 | Homchaudhuri et al. | |
| 2014/0082242 A1 | 3/2014 | Murphy et al. | |
| 2014/0250348 A1 | 9/2014 | Harari et al. | |
| 2014/0281622 A1 | 9/2014 | Wagh et al. | |

* cited by examiner

*Primary Examiner* — Christopher Shin
(74) *Attorney, Agent, or Firm* — Vierra Magen Marcus LLP

(57) ABSTRACT

Data transfer between a data storage device and a peripheral device bypasses an application processor that is coupled to the data storage device and to the peripheral device. In one embodiment, the data storage device includes a memory controller configured to receive, from an application processor, a message indicating a set of logical addresses and a data transfer identifier corresponding to the set of logical addresses. The memory controller is responsive to a request for memory access that includes the data transfer identifier and that is received from a peripheral device. The memory controller is configured to respond to the request by performing a memory access operation based on the set of logical addresses.

26 Claims, 7 Drawing Sheets

US 10,078,614 B2

SYSTEMS AND METHODS OF DATA TRANSFER

CROSS-REFERENCE TO RELATED APPLICATIONS

The present application claims benefit of U.S. Provisional Application No. 62/203,365 filed Aug. 10, 2015, which is incorporated by reference herein in its entirety.

FIELD OF THE DISCLOSURE

This disclosure is generally related to transferring data.

BACKGROUND

An electronic device, such as a mobile device (e.g., a smartphone or a tablet), may be configured to download data from or upload data to other devices or entities associated with a network. The electronic device may include multiple components or sub-systems, such as an application processor, a data storage device, and a peripheral device. The peripheral device may be configured to provide a particular functionality, such as wireless connectivity functionality to enable the electronic device to communicate with a network device and/or a remote device.

The application processor may manage the downloading of data via the peripheral device and storing of the data at the data storage device. The application processor may also manage uploading of data from the data storage device to the peripheral device to enable to peripheral device to send the data to a network device (e.g., a cloud storage device) and/or to a remote device (e.g., a mobile device). To illustrate, to send data from the storage device to a remote device, the application processor may send a read request to the storage device, receive the data from the storage device, and store the data at a main memory (e.g., a dynamic random-access memory (DRAM)) of a chipset that includes the application processor. The application processor may packetize the data according to a communication protocol stack of one or more protocol layers and may send the packetized data to the peripheral device to be communicated to the remote device. The application processor may also perform operations to receive data from a remote device via the peripheral device and to store the received data at the storage device. Accordingly, the application processor is active and consuming power during transfer of the data between the storage device and the peripheral device. Additionally, processing (e.g., packetizing) the data at the application processor according to the communication protocol stack increases an amount of time to transfer data between the data storage device and the peripheral device and consumes processing resources at the application processor.

DETAILED DESCRIPTION

Figure 1:
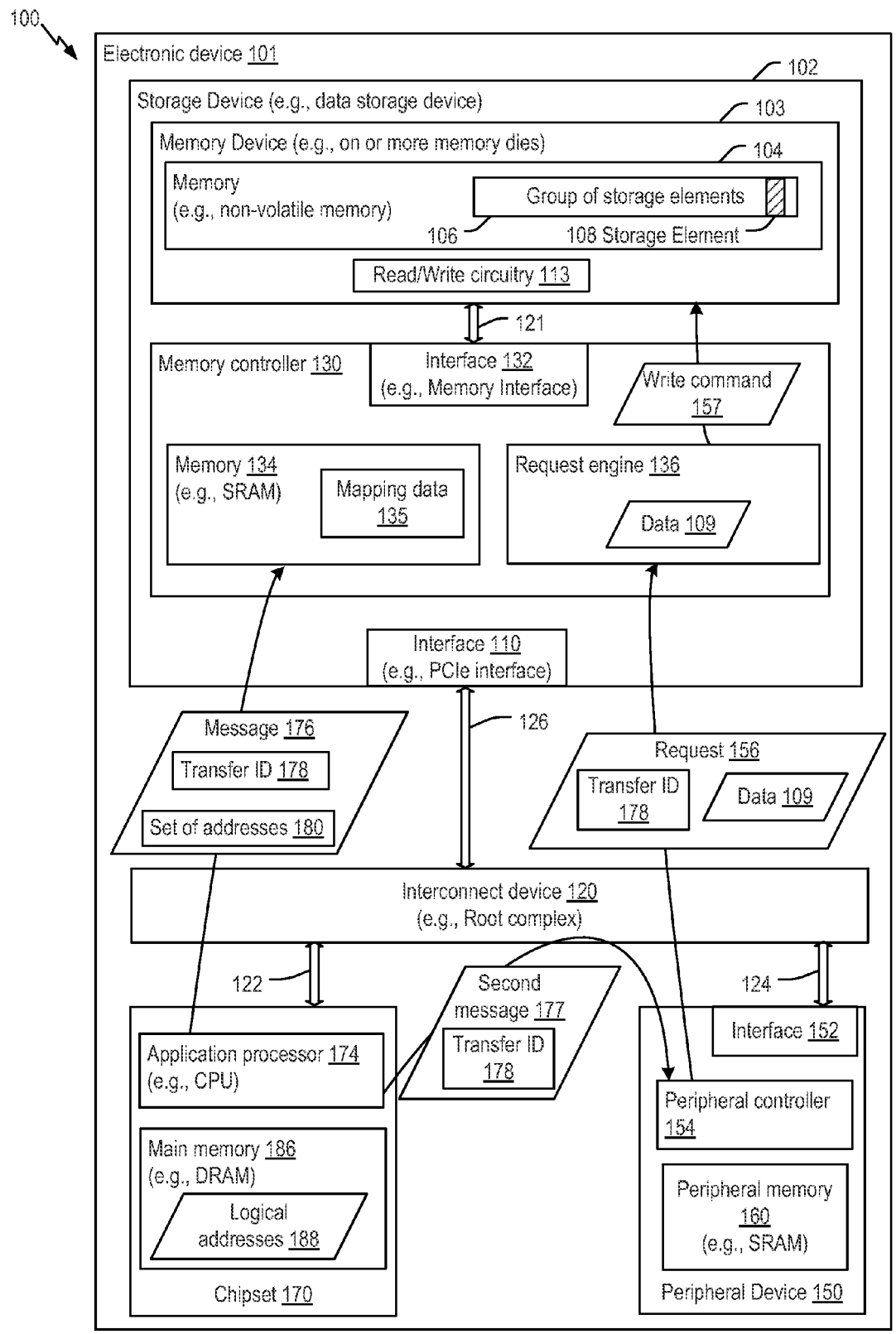
FIG. 1 is a block diagram of a first illustrative example of an electronic device including a data storage device operable to receive a write request from a peripheral device.

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "examplary" may indicate an example, an implementation, and/or an aspect, and should not be construed as limiting or as indicating a preference or a preferred example, implementation, and/or aspect.

The present disclosure describes systems and methods for managing data transfers within an electronic device, such as a mobile device. The electronic device may include multiple sub-systems, such as a chipset (including an application processor), a storage device, and a connectivity device or other peripheral device. In some implementations, each of the chipset, the storage device, and connectivity device (e.g., a peripheral device) may be coupled to an interconnect device. For example, the interconnect device may include a root complex and each of the storage device and the peripheral device may be coupled to the root complex via a corresponding a peripheral component interconnect express (PCIe) interface. The chipset (e.g., the application processor) may generate a message that includes information to enable a transfer of data between the storage device and the peripheral device. To illustrate, the data may be transferred from the storage device to the peripheral device or from the peripheral device to the storage device. The information may include a data transfer identifier corresponding to an access request (e.g., a read request or a write request) and may indicate a set of logical addresses, such as a set of logical block addresses (LBAs), associated with the storage device. The data transferred between the storage device and the peripheral device may bypass one or more components of the chipset, such as the application processor, a main memory, a bus, etc. For example, the data may bypass the application processor of the chipset (e.g., the data may be transferred between the storage device and the peripheral device without being provided to the application processor during the transfer of the data).

In some implementations, one or more components (e.g., the application processor, the main memory, etc.) of the chipset may be in a standby mode or low power mode during the transfer of data between the storage device and the peripheral device. The storage device or the peripheral device may be configured to maintain a communication protocol stack to enable processing of the data to be sent to or received from a remote device via the peripheral device.

By bypassing one or more components of the chipset during the transfer of the data, a power consumption of the chipset may be reduced. Additionally, bypassing the one or more components of the chipset may reduce an amount of time to transfer the data between the storage device and the peripheral device as compared to routing the data via the application processor and/or the main memory of the chipset.

FIG. 1 depicts an illustrative example of a system 100. The system 100 includes an electronic device 101, such as a mobile device (e.g., a smart phone or tablet), a network device (e.g., a server), or another electronic device. To illustrate, the electronic device 101 may include a mobile telephone, a computer (e.g., a laptop, a tablet, or a notebook computer), a music player, a video player, a gaming device or console, an electronic book reader, a personal digital assistant (PDA), a portable navigation device, a network computer, a server, any other electronic device, or any combination thereof, as illustrative, non-limiting examples. As additional examples, the electronic device 101 may include a network accessible data storage device, such as an enterprise data storage device, a network-attached storage device, or a cloud data storage device.

The electronic device 101 may include multiple subsystems, such as multiple discrete components and/or multiple discrete devices that may be coupled together. For example, the electronic device 101 includes a storage device 102 that is configured to store data generated by the electronic device 101 or received by the electronic device 101 from another electronic device, such as a remote device. The electronic device 101 includes a chipset 170 that is configured to execute one or more applications (e.g., software and/or firmware) of the electronic device 101. The electronic device 101 also includes a peripheral device 150. The storage device 102, the chipset 170, and the peripheral device 150 may be coupled together via an interconnect device 120 of the electronic device 101, as described further herein.

The peripheral device 150 may be configured to provide a particular functionality. For example, the peripheral device 150 may be configured to provide connectivity between the electronic device 101 and another device, such as a remote device. To illustrate, the peripheral device 150 may be configured to provide connectivity to another device, such as a universal serial bus (USB) mass storage device, that is physically or wirelessly coupled to the electronic device 101. As another example, the peripheral device 150 may be configured to provide connectivity to another device via a network, such as a wired network, a wireless network, or a combination thereof. For example, the peripheral device 150 may include an Ethernet device, a wireless fidelity (Wi-Fi) device, a Bluetooth device, a long term evolution (LTE) device, or a wireless gigabit alliance (WiGig) device, as illustrative, non-limiting examples. In other implementations, the peripheral device 150 can provide other functionality, such as an audio device or a graphics accelerator, as illustrative, non-limiting examples. Although the electronic device 101 is described as including a single peripheral device 150, in other implementations, the electronic device 101 may include multiple peripheral devices.

The interconnect device 120 may include a bridge or a root complex. For example, the interconnect device 120 may include a root complex that includes one or more ports, such as one or more peripheral component interconnect express (PCIe) ports, and may include one or more switch devices connected to a particular port of the root complex. Although the interconnect device 120 is described as being separate from the chipset 170, separate from the storage device 102, and separate from the peripheral device 150, in some implementations, the interconnect device 120 may be included in one of the chipset 170, the storage device 102, and the peripheral device 150. For example, the interconnect device 120 may be included in the chipset 170.

The chipset 170 may include the application processor 174, such as a central processing unit (CPU), and a main memory 186. The chipset 170 may be coupled to the interconnect 120 via a connection (e.g., a communication path 122), such as a bus. For example, the communication path 122 may include a PCIe bus. The application processor 174 may be configured to communicate with the storage device 102 via the interconnect device 120, and to communicate with the peripheral device 150 via the interconnect device 120. To illustrate, the application processor 174 may be configured to send data to or receive data from the storage device 102. For example, the application processor 174 may be configured to send a write request or a read request to the storage device 102. The application processor 174 may also be configured to send data to and receive data from the peripheral device 150. The application processor 174 may operate in compliance with a Joint Electron Devices Engineering Council (JEDEC) industry specification, such as a Universal Flash Storage (UFS) Access Controller Interface specification. As other examples, the application processor 174 may operate in compliance with one or more other specifications, such as a Secure Digital (SD) Access Controller specification, a Non-Volatile Memory Express (NVMe) specification or a PCIe standard, as illustrative, non-limiting examples. The application processor 174 may communicate with the storage device 102 or the peripheral device 150 in accordance with any other suitable communication protocol.

The main memory 186, such as a dynamic random-access memory (DRAM), may be configured to store data, such as logical addresses 188 (e.g., logical block addresses) associated with files stored on the storage device 102. The main memory 186 may also be configured to store instructions (e.g., firmware or software) that may be executable by the application processor 174. For example, software executed by the application processor 174 may be associated with an application. The main memory 186 may be a single memory or may include multiple memories, such as one or more non-volatile memories, one or more volatile memories, or a combination thereof. The chipset 170 may issue one or more commands to the storage device 102, such as one or more requests to erase data, read data from, or write data to a memory device 103 of the storage device 102. Additionally or alternatively, the chipset 170 may issue one or more commands to the peripheral device 150, such as one or more requests to transmit data.

The peripheral device 150 includes a peripheral controller 154 and a peripheral memory 160 that is coupled to the peripheral controller 154. In some implementations, the peripheral memory 160 may include a static random-access memory (SRAM). The peripheral device 150 may be coupled to the interconnect 120 via a connection (e.g., a communication path 124), such as a bus. For example, the communication path 124 may include a PCIe bus. The peripheral device 150 may include an interface 152 (e.g., a PCIe interface) that enables communication via the communication path 124 and the interconnect device 120. The main memory 186 may be configured to store data and instructions (e.g., firmware or software) that may be executable by the peripheral controller 154. The peripheral memory 160 may be a single memory or may include multiple memories, such as one or more non-volatile memories, one or more volatile memories, or a combination thereof.

The storage device 102 includes a memory controller 130 and the memory device 103 that is coupled to the memory controller 130. The storage device 102 may be coupled to the interconnect 120 via a connection (e.g., a communication path 126), such as a bus. For example, the communication path 126 may include a PCIe bus. The storage device 102 may include an interface 110 (e.g., a PCIe interface) that enables communication via the communication path 126 and the interconnect device 120.

In some implementations, the storage device 102 may be attached to or embedded within the electronic device 101, such as within a housing of the electronic device 101 that includes the chipset 170. For example, the storage device 102 may be embedded within the electronic device 101, such as in accordance with a Joint Electron Devices Engineering Council (JEDEC) Solid State Technology Association Universal Flash Storage (UFS) configuration. For example, the storage device 102 may be configured to be coupled to the chipset 170 as embedded memory, such as eMMC® (trademark of JEDEC Solid State Technology Association, Arlington, Va.) and eSD, as illustrative examples. To illustrate, the storage device 102 may correspond to an eMMC (embedded MultiMedia Card) device. As another example, the storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.).

In other implementations, the storage device 102 may be implemented as a "removable" device. For example, the storage device 102 may be removable from the electronic device 101 (i.e., "removably" coupled to the electronic device 101). To illustrate, the storage device 102 may be removably coupled to the interconnect device 120 and/or to the chipset 170. As an example, the storage device 102 may be removably coupled to the electronic device 101 (e.g., the chipset 170 including an application processor 174) in accordance with a removable universal serial bus (USB) port configuration.

The storage device 102 may operate in compliance with a JEDEC industry specification. For example, the storage device 102 may operate in compliance with a JEDEC eMMC specification, a JEDEC Universal Flash Storage (UFS) specification, one or more other specifications, or a combination thereof. In some implementations, the storage device 102 and the chipset device 170 (e.g., the application processor 174) or the peripheral device 150 may be configured to communicate using one or more protocols, such as an eMMC protocol, a universal flash storage (UFS) protocol, a universal serial bus (USB) protocol, a serial advanced technology attachment (SATA) protocol, a non-volatile memory express (NVMe) protocol, a peripheral component interconnect express (PCIe) protocol, and/or another protocol, as illustrative, non-limiting examples.

The memory device 103 of the storage device 102 may include one or more memory dies (e.g., one memory die, two memory dies, eight memory dies, or another number of memory dies). The memory device 103 includes a memory 104, such as a non-volatile memory of storage elements included in a memory die of the memory device 103. For example, the memory 104 may include a flash memory, such as a NAND flash memory, as illustrative, non-limiting examples. The memory 104 may have a three-dimensional (3D) memory configuration. As an example, the memory 104 may have a 3D vertical bit line (VBL) configuration. In a particular implementation, the memory 104 is a non-volatile memory having a 3D memory configuration that is monolithically formed in one or more physical levels of arrays of storage elements (e.g., memory cells) having an active area disposed above a silicon substrate. Alternatively, the memory 104 may have another configuration, such as a two-dimensional (2D) memory configuration or a non-monolithic 3D memory configuration (e.g., a stacked die 3D memory configuration).

The memory device 103 (and/or the memory 104) may include circuitry associated with operation of the storage elements of the memory 104. For example, the memory device 103 (and/or the memory 104) may include support circuitry, such as read/write circuitry 113, to support operation of one or more memory dies of the memory device 103. Although depicted as a single component, the read/write circuitry 113 may be divided into separate components of the memory device 103, such as read circuitry and write circuitry. The read/write circuitry 113 may be external to the one or more dies of the memory device 103. Alternatively, one or more individual memory dies of the memory device 103 may include corresponding read/write circuitry that is operable to read data from and/or write data to storage elements within the individual memory die independent of any other read and/or write operations at any of the other memory dies.

The memory 104 may include multiple groups of storage elements. For example, the memory 104 may include a representative group of storage elements 106 (e.g., a group of memory cells). The group of storage elements 106 may include a representative storage element 108 (e.g., a memory cell). The storage element 108 may be configured to function as a single-level-cell (SLC), as a multi-level-cell (MLC), or as a tri-level-cell (TLC), as illustrative, non-limiting examples. Each of the groups of storage elements, such as the group of storage elements 106, of the memory 104 may correspond to one or more word lines, blocks, planes, or another definable group of storage elements.

The memory controller 130 is coupled to the memory device 103 via a bus 121, an interface 132 (e.g., interface circuitry), another structure, or a combination thereof. For example, the bus 121 may include one or more channels to enable the memory controller 130 to communicate with a single memory die of the memory device 103. As another example, the bus 121 may include multiple distinct channels to enable the memory controller 130 to communicate with each memory die of the memory device 103 in parallel with, and independently of, communication with other memory dies of the memory device 103.

The memory controller 130 is configured to receive data and instructions from the application processor 174 (or the peripheral device 150) and to send data to the application processor 174 (or to the peripheral device 150). For example, the memory controller 130 may send data to the application processor 174 via the interconnect device 120, and the memory controller 130 may receive data from the application processor 174 via the interconnect device 120. As another example, the memory controller 130 may send data to the peripheral device 150 via the interconnect device 120, and the memory controller 130 may receive data from the peripheral device 150 via the interconnect device 120.

The memory controller 130 includes a memory 134 and a request engine 136. In some implementations, the memory 134 may be a static random-access memory (SRAM). The memory 134 may include mapping data 135, such logical to physical (L2P) mapping data. For example, the mapping data 135 may include data that maps a logical address (e.g., a logical block address) to a physical address (e.g., a physical block address) of the memory 104. In some implementations, the logical addresses may be maintained by the application processor 174 (e.g., a file system application executed by the application processor 174).

The request engine 136 may be configured to send data and commands to the memory 104 and to receive data from the memory 104. For example, the request engine 136 is configured to send data and a write command to cause the memory 104 to store data to a specified address of the memory 104. The write command may specify a physical address of a portion of the memory 104 (e.g., a physical address of a word line of the memory 104) that is to store the data. The request engine 136 is configured to send a read command to the memory 104 to access data from a specified address of the memory 104. The read command may specify the physical address of a portion of the memory 104 (e.g., a physical address of a word line of the memory 104). The request engine 136 may also be configured to send data and commands to the memory 104 associated with background scanning operations, garbage collection operations, and/or wear leveling operations, etc., as illustrative, non-limiting examples.

In some implementations, the request engine 136 may be configured to receive a write request from the application processor 174 or the peripheral device 150 to write first data to the memory 104. The write request may be associated with a first logical address (e.g., a first logical block address). The request engine 136 may access the mapping data 135 to determine a first physical address of the memory 104 that corresponds to the first logical address. The request engine 136 may generate a write command that indicates the first physical address and may send the write command and the data to the memory 104. Additionally or alternatively, the request engine 136 may be configured to receive a read request from the application processor 174 or the peripheral device 150 to read second data from the memory 104. The read request may be associated with a second logical address (e.g., a second logical block address). The request engine 136 may access the mapping data 135 to determine a second physical address of the memory 104 that corresponds to the second logical address. The request engine 136 may generate a read command that indicates the second physical address and may send the read command and the data to the memory 104. In response to the read command, the request engine 136 may receive the second data from the memory 104 and may send the second data to the device (e.g., the application processor 174 or the peripheral device 150) from which the request engine 136 received the read request.

During operation, the application processor 174 may determine that data 109 is to be transferred from the peripheral device 150 to the storage device 102. The application processor 174 of the chipset 170 may identify a set of logical addresses 180 (e.g., a set of LBAs) of the logical addresses 188. To illustrate, the application processor 174 may execute a file system application that maintains (e.g., tracks) the logical addresses 188 corresponding to the storage device 102. In response to determining that the data 109 is to be stored at the storage device 102 (e.g., the data 109 is to be transferred from the peripheral device 150 to the storage device 102), the file system application may identify and allocate the set of logical addresses 180 to be used to store the data 109 at the storage device 102. The application processor 174 may also generate a transfer identifier (ID) 178 that corresponds to the transfer of the data 109 from the peripheral device 150 to the storage device 102. In some implementations, the transfer ID 178 may include a file ID of the data 109.

The application processor 174 may generate a message 176 that includes information, such as the transfer ID 178 and the set of addresses 180 or an indicator of the set of addresses 180. For example, the message 176 may include at least one logical block address (e.g., a starting address), a range of logical block addresses (e.g., a starting address and an ending address), or a list of logical block addresses. As another example, the message 176 may include a single logical block address (e.g., a starting address) and a size of the data 109, or a single logical block address and a total number of logical block addresses for the data 109.

The application processor 174 may send the message 176 to the storage device 102 via the interconnect device 120. The storage device 102 may store the message 176 (e.g., the transfer ID 178 and the set of addresses 180) at the memory 134. Additionally, the application processor 174 may generate a second message 177 that includes the transfer ID 178. The second message 177 may also include one or more "connectivity parameters" to enable the peripheral device 150 to communicate with another device, such as a remote device via a wireless network, autonomously (e.g., without support from the application processor 174 and/or the chipset 170). For example, "connectivity parameters" may include an indicator or tag of a source device (e.g., a wireless remote device communicatively coupled to the electronic device 101), an indicator or tag of a destination device (e.g., the electronic device 101), a file tag for a data source (e.g., a file name of the data at the source device), a file tag for a data destination (e.g., a file name for the data at the destination device), one or more other parameters (e.g., port information, protocol information, etc.), or any combination thereof, as illustrative, non-limiting examples. The application processor 174 may send the second message 177 to the peripheral device 150 (e.g., to the peripheral controller 154) via the interconnect device 120.

After receiving the second message 177, the peripheral controller 154 may identify the transfer ID 178 included in the second message 177. The peripheral device 150 may generate a request 156, such as an access request (e.g., a write request) that includes the transfer ID 178 and the data 109. The peripheral device 150 may send the request 156 to the storage device 102 via the interconnect device 120.

The request 156 may be received by the storage device 102 and may be provided to the request engine 136 (e.g., the memory controller 130). The request engine 136 may parse the request 156 to identify the transfer ID 178. The request engine 136 may match the transfer ID 178 included in the request 156 to the transfer ID 178 of the message 176 stored at the memory 134. In response to identifying the message 176 (based on the transfer ID 178), the request engine 136 may receive the set of addresses 180 (included in the message 176) from the memory 134. The request engine 136 may use the mapping data 135 to identify a set of physical addresses of the memory 104. For example, the request engine 136 may use the mapping data 135 to map a first logical address of the set of addresses 180 to a first physical address of the memory 104.

The request engine 136 may generate a write command 157 that includes a set of physical addresses that are mapped to the set of logical addresses 180 and that also includes the data 109. The request engine 136 may send the write command 157 to the memory device 103. The memory device 103 may execute the write command 157 to store the data 109 at one or more storage locations that correspond to the set of physical addresses.

In response to the data 109 being written to the memory 104, the memory controller 130 may send a "request complete" message to the peripheral device 150. In response to the request complete message, the peripheral device 150 (e.g., the peripheral controller 154) may send a notification to the application processor 174 to indicate that the data transfer corresponding to the transfer ID 178 is complete. For example, the notification may include the transfer ID 178. In response to receiving the notification, the application processor 174 may update the logical addresses 188 to indicate that the set of addresses correspond to the data 109.

In another implementation, the application processor 174 may generate the message 176 (e.g., including one or more connectivity parameters to enable communication with a remote device) and may send the message 176 to the peripheral device 150. In this implementation, the application processor 174 may not generate the second message 177. The peripheral device 150 may store the message 176 in the peripheral memory 160. The peripheral controller 154 may generate the request 156 (e.g., a write access request) that includes the data 109 and at least one logical address of the set of logical addresses 180. The peripheral device 150 may send the request 156 that includes the data 109 and the at least one logical address to the storage device 102 via the interconnect device 120.

The storage device 102 may receive the request 156 and may parse the request 156 to identify the data 109 and the at least one logical address. The request engine 136 may access the mapping data 135 to determine at least one physical address based on the at least one logical address. The request engine 136 may generate the write command 157 that includes the data 109 and the at least one physical address. The request engine 136 may send the write request 157 to the memory device 103 to cause the data 109 to be written to the memory 104. After the write request 157 is completed, the memory controller 130 may send a "request complete" message to the peripheral device 150.

In some implementations, one or more of the mapping data 135, the transfer ID 178, the set of addresses 180, and the logical addresses 188 may be stored at the memory 104. Additionally or alternatively, one or more of the mapping data 135, the transfer ID 178, the set of addresses 180, and the logical addresses 188 may be stored at the main memory 186 and/or at the peripheral memory 160. In other implementations, the memory controller 130 may include or may be coupled to a particular memory (e.g., the memory 134), such as a random access memory (RAM), that is configured to store the mapping data 135, the transfer ID 178, the set of addresses 180, or the logical addresses 188. Alternatively, or in addition, the memory controller 130 may include or may be coupled to another memory (not shown), such as a non-volatile memory, a RAM, or a read only memory (ROM). The other memory may be a single memory component, multiple distinct memory components, and/or may include multiple different types (e.g., volatile memory and/or non-volatile) of memory components. In some implementations, the other memory may be wirelessly or otherwise removably coupled to the electronic device 101.

Although one or more components of the electronic device 101 have been described with respect to certain portions the storage device 102, the peripheral device 150, or the chipset 170, in other implementations, certain components may be included elsewhere in the storage device 102, the peripheral device 150, or the chipset 170. For example, although the mapping data 135 and the request engine 136 of the storage device 102 have been described with respect to the memory controller 130, in other implementations, the mapping data 135 or the request engine 136 may be included in the memory device 103 (e.g., the memory 104). Alternatively, or in addition, one or more functions as described above with reference to the memory controller 130 may be performed at or by the memory device 103. For example, one or more functions of the request engine 136 may be performed by components and/or circuitry included in the memory device 103.

Although shown as components of the electronic device 101, in other implementations one or more of the storage device 102, the chipset 170, and/or the peripheral device 150 may be external to and/or removably coupled to the electronic device 101. For example, the storage device 102 may be external to the electronic device 101 and may be coupled to the chipset 170 via a wireless connection.

In some implementations, the storage device 102 may be a component (e.g., a solid-state drive (SSD)) of the electronic device 101 which may include a network accessible data storage system, such as an enterprise data system, a network-attached storage system, a cloud data storage system, etc. In other implementations, the storage device 102 may be coupled to or included in the electronic device 101 and may be accessible to another device (e.g., an access device). For example, the storage device 102 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the storage device 102 is accessible to the other device (e.g., the access device) indirectly, e.g., via a network. For example, the network may include a data center storage system network, an enterprise storage system network, a storage area network, a cloud storage network, a local area network (LAN), a wide area network (WAN), the Internet, and/or another network. In some implementations, the electronic device 101 (e.g., the storage device 102) may be a network-attached storage (NAS) device or a component (e.g., a solid-state drive (SSD) device) of a data center storage system, an enterprise storage system, or a storage area network.

By providing the message 176 (including the set of addresses 180) from the application processor 174 to the storage device 102 (and/or to the peripheral device 150), the application processor 174 may enable data to be transferred between the peripheral device 150 and the storage device 102. In a first implementation, the peripheral device 156 may send the access request 156 (e.g., a write request) to the storage device 102 and the storage device 102 may perform a memory access operation (e.g., a write operation) based on the set of addresses 180. In a second implementation, the peripheral device 150 may send an access request (e.g., a write request) to the storage device 102 that includes the set of addresses 180 and the storage device 102 may perform a memory access operation (e.g., a write operation) based on the set of addresses 180. In both of the first implementation and the second implementation, the data 109 associated with the access request (e.g., the write request) may be transferred from the peripheral device 150 to the storage device 120 via the interconnect device 120 (without being provided to the application processor 174). Accordingly, the transfer of the data 109 may bypass the application processor 174. By bypassing the application processor 174 (and one or more other components of the chipset 170) during the transfer of the data 109, an amount of time to transfer the data between the peripheral device 150 and the storage device 102 may be reduced as compared to if the data 109 were routed from the peripheral device 150 to the storage device 102 via the application processor 174. Additionally, because the data 109 bypasses the application processor 174 (and/or one or more other components of the chipset 170), the application processor 174 (and/or the one or more other components of the chipset 170) may enter a lower power mode or standby mode during transfer of the data 109 between the peripheral device 150 and the storage device 102. By entering the low power or standby mode, a power consumption of the chipset 170 may be reduced during the data 109 being transferred between the peripheral device 150 and the storage device 102.

Figure 2:
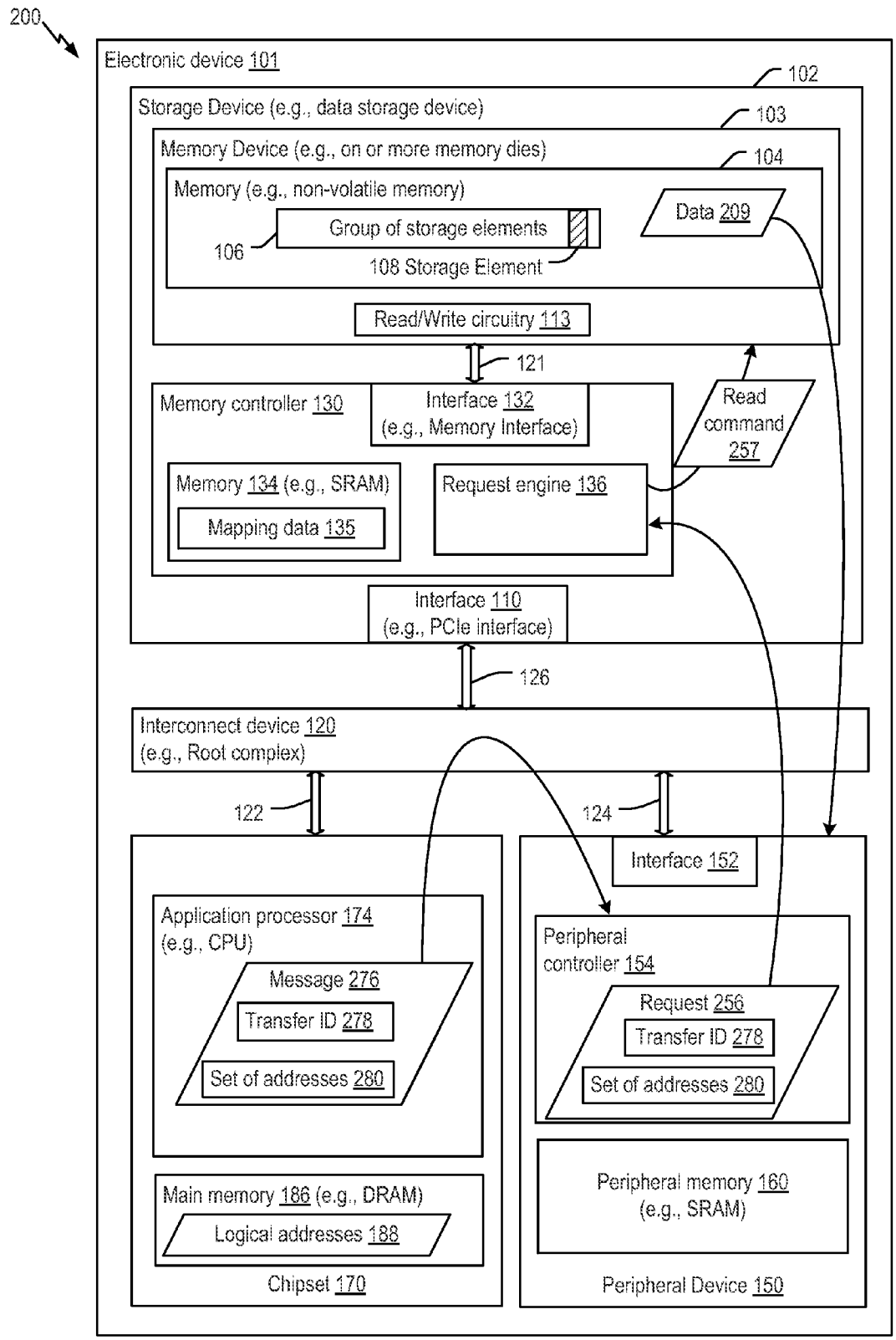
FIG. 2 is a block diagram of a second illustrative example of an electronic device including a data storage device operable to receive a read request from a peripheral device.

Referring to FIG. 2, an illustrative example of a system 200. The system 200 includes the electronic device 101 of FIG. 1. In some implementations, the system 200 may be configured to operate in accordance with the system 100 as described with reference to FIG. 1.

During operation, the application processor 174 may determine that data 209 is to be transferred from the storage device 102 to the peripheral device 150. The application processor 174 of the chipset 170 may identify a set of logical addresses 280 (e.g., a set of LBAs) of the logical addresses 188 that correspond to one or more storage locations where the data 209 is stored at the storage device 102. To illustrate, the application processor 174 may execute a file system application that maintains (e.g., tracks) the logical addresses 188 corresponding to the storage device 102. In response to determining that the data 209 is to be transferred from the storage device 102 to the peripheral device 150, the file system application may identify the set of logical addresses 280 that may be used by the storage device 102 to access the data 209. The application processor 174 may also generate a transfer identifier (ID) 278 that corresponds to the transfer of the data 209 from the storage device 102 to the peripheral device 150. In some implementations, the transfer ID 278 may include a file ID of the data 209.

The application processor 174 may generate a message 276 that includes information, such as the transfer ID 278 and the set of addresses 280. The message 276 may also include one or more connectivity parameters to enable communication with a remote device, such as described with reference to FIG. 1. The application processor 174 may send the message 276 to the peripheral device 150 via the interconnect device 120. The peripheral device 150 may store the message 276 in the peripheral memory 160. The peripheral controller 154 may generate a request 256 (e.g., a read access request) that includes the set of logical addresses 280. The request 256 may optionally include the transfer ID 278. The peripheral device 150 may send the request 256 to the storage device 102 via the interconnect device 120.

The storage device 102 may receive the request 256 and may parse the request 256 to identify the data 209 and the set of logical addresses 280. The request engine 136 may access the mapping data 135 to determine at least one physical address based on the set of logical address 280. The request engine 136 may generate a read command 257 that includes the at least one physical address. The request engine 136 may send the read command 257 to the memory device 103 to cause the data 209 to be read from the memory 104 and provided to the memory controller 130. After the read request 127 is complete, the memory controller 130 may send the data 209 to the peripheral device 150 via the interconnect device 120. In some implementations, after the data 209 is sent from the storage device 102 to the peripheral device 105, the storage device 102 (e.g., the controller 130) may send a "request complete" message to the peripheral device 150. In response to the request complete message, the peripheral device 150 (e.g., the peripheral controller 154) may send a notification to the application processor 174 to indicate that the data transfer corresponding to the transfer ID 278 is complete. For example, the notification may include the transfer ID 278.

In another implementation, the application processor 174 may generate the message 276 and may send the message 276 to the storage device 102 via the interconnect device 120. The storage device 102 may store the message 276 (e.g., the transfer ID 178 and the set of addresses 180) at the memory 134. In this implementation, the application processor 174 may generate a second message (not shown) that includes the transfer ID 278. The application processor 174 may send the second message to the peripheral device 150 (e.g., to the peripheral controller 154) via the interconnect device 120.

After receiving the second message, the peripheral controller 154 may identify the transfer ID 278 included in the second message. The peripheral device 150 may generate a request, such as an access request (e.g., a read request) that includes the transfer ID 278. The peripheral device 150 may send the request to the storage device 102 via the interconnect device 120.

The storage device 102 may provide the request to the request engine 136 (e.g., the memory controller 130). The request engine 136 may parse the request to identify the transfer ID 278. The request engine 136 may match the transfer ID 278 included in the request to the transfer ID 278 of the message 276 stored at the memory 134. In response to identifying the message 276 (based on the transfer ID 278), the request engine 136 may receive the set of addresses 280 (included in the message 276) from the memory 134. The request engine 136 may use the mapping data 135 to identify a set of physical addresses of the memory 104. For example, the request engine 136 may use the mapping data 135 to map a first logical address of the set of addresses 280 to a first physical address of the memory 104.

The request engine 136 may generate the read command 257 that includes the set of physical addresses and may send the read command 257 to the memory device 103. The memory device 103 may execute the read command 257 and may provide the data 209 to the memory controller 130 in response to the read command 257 being executed.

After the read request 256 is complete, the memory controller 130 may send the data 209 to the peripheral device 150 via the interconnect device 120. In some implementations, after the data 209 is sent from the storage device 102 to the peripheral device 105, the storage device 102 (e.g., the controller 130) may send a "request complete" message to the peripheral device 150.

By providing the message 276 (including the set of addresses 280) from the application processor 174 to the storage device 102 (and/or to the peripheral device 150), the application processor 174 may enable data to be transferred between the peripheral device 150 and the storage device 102. For example, the peripheral device 150 may send an access request (e.g., a read request) to the storage device 102 and, responsive to the access request, the storage device 102 may send the data 209 to the peripheral device. The data 209 associated with the access request (e.g., the read request) may be transferred from the storage device 102 to the peripheral device 150 via the interconnect device 120 (without being provided to the application processor 174). Accordingly, the transfer of the data 209 may bypass the application processor 174. By bypassing the application processor 174 (and one or more other components of the chipset 170) during the transfer of the data 209, an amount of time to transfer the data 209 between the peripheral device 150 and the storage device 102 may be reduced as compared to if the data 209 were routed from the peripheral device 150 to the storage device 102 via the application processor 174. Additionally, because the data 209 bypasses the application processor 174 (and/or one or more other components of the chipset 170), the application processor 174 (and/or the one or more other components of the chipset 170) may enter a lower power mode or standby mode during transfer of the data 209 between the peripheral device 150 and the storage device 102. By entering the low power or standby mode, a power consumption of the chipset 170 may be reduced during the data 209 being transferred between the storage device 102 and the peripheral device 150.

Figure 3:
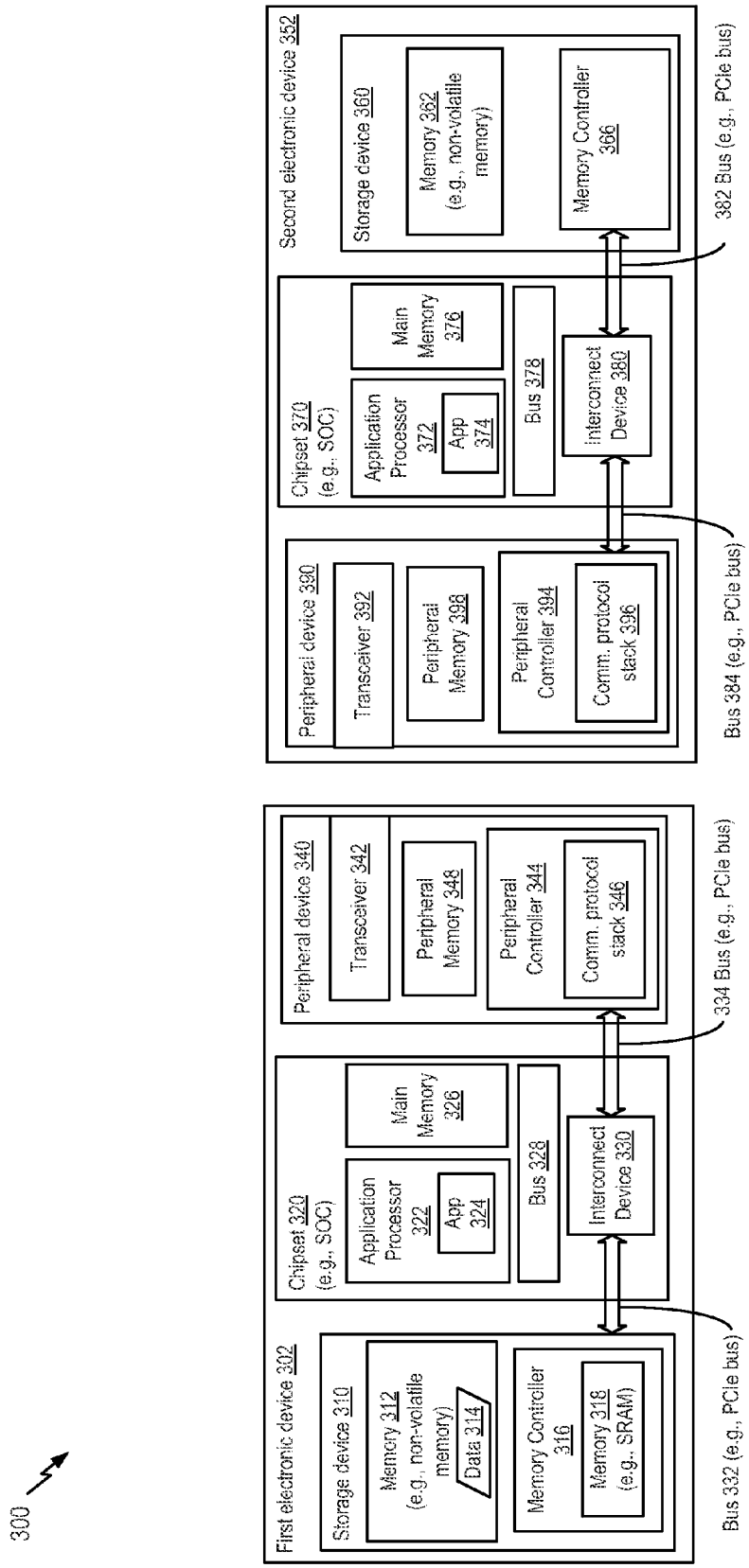
FIG. 3 is a block diagram of a particular illustrative example of a system including a first electronic device configured to transfer data to a second electronic device.

Referring to FIG. 3, an illustrative example of a system to transfer data between two electronic devices is depicted and generally designated 300. The system 300 includes a first electronic device 302 and a second electronic device 352. The first electronic device 302 and/or the second electronic device 352 may include or correspond to the electronic device 101 of FIGS. 1 and 2. In some implementations, the first electronic device 302 may be configured to operate as described with reference to the electronic device 101 of FIG. 2 and the second electronic device 352 may be configured to operate in accordance with the electronic device 101 of FIG. 1. The first electronic device 302 may be communicatively coupled to the second electronic device 352 via one or more networks, such as a wired network, a wireless network, or a combination thereof.

The first electronic device 302 may include a storage device 310, a chipset 320, and a peripheral device 340. The storage device 310, the chipset 320, and the peripheral device 340 may include the storage device 102, the chipset 170, and the peripheral device 150 of FIG. 1, respectively. The storage device 310 includes a memory 312 (e.g., a non-volatile memory) and a memory controller 316. The memory 312 may be configured to store data 314. The memory controller 316 includes a memory 318, such as a static random-access memory (SRAM).

The chipset 320 may include an application processor 322, a main memory 326, a bus 328, and an interconnect device 330. In some implementations, the chipset 320 may correspond to a system on chip (SOC) that integrates multiple components on a single chip. The interconnect device 330 may correspond to the interconnect device 120 of FIG. 1. The interconnect device 330 may be configured to communicatively couple the storage device 310 and the peripheral device 340 to the chipset 320. For example, the storage device 310 may be coupled to the interconnect device 330 via a bus 332, such as a PCIe bus. As another example, the peripheral device 340 may be coupled to the interconnect device 330 via a bus 334, such as a PCIe bus. The bus 328 may be configured to communicatively couple the application processor 322, the main memory 326, and the interconnect device 330. The application processor 322 may be configured to execute one or more applications (e.g., one or more software or firmware applications), such as a representative application 324.

The peripheral device 340 may include a connectivity device that is configured to transmit (via wired or wireless communication) with another device. The peripheral device 340 may include a transceiver 342, a peripheral memory 348, and a peripheral controller 344. The transceiver 342 may include a transmitter, a receiver, or both. The transceiver 342 may be configured to transmit one or more messages (e.g., data packets) generated by the first electronic device 302 and to receive one or more messages (e.g., data packets) transmitted to the first electronic device 302 by another device, such as the second electronic device 352. The peripheral controller 344 may be configured to maintain a communication protocol stack 346. For example, the peripheral controller 344 may be configured to execute a communication protocol stack application. The communication protocol stack 346 may correspond to a communication protocol (e.g., hypertext transfer protocol (HTTP) or file transfer protocol (FTP)) to be used to transmit data between the first electronic device 302 and another electronic device, such as the second electronic device 352. The peripheral memory 348, such as an SRAM, may be configured to store data, instructions (e.g., firmware or software) that may be executable by the peripheral controller 344, or a combination thereof. For example, software executed by the peripheral controller 344 may be associated with an application, such as a communication protocol stack application associated with the communication protocol stack 346.

The second electronic device 352 may include a storage device 360, a chipset 370, and a peripheral device 390. The storage device 360, the chipset 370, and the peripheral device 390 may include the storage device 102, the chipset 170, and the peripheral device 150 of FIG. 1, respectively. In some implementations, the storage device 360, the chipset 370, and the peripheral device 390 may correspond to the storage device 310, the chipset 320, and the peripheral device 340, respectively, of the first electronic device 302.

The storage device 360 may include a memory 362 and a memory controller 366. The memory 362 (e.g., a non-volatile memory) may be configured to receive data. The chipset 370 may include an application processor 372, a main memory 376, a bus 378, and an interconnect device 380. In some implementations, the chipset 370 may correspond to a system on chip (SOC) that integrates multiple components on a single chip. The interconnect device 380 may correspond to the interconnect device 120 of FIG. 1. The interconnect device 380 may be configured to communicatively couple the storage device 360 and the peripheral device 390 to the chipset 370. For example, the storage device 360 may be coupled to the interconnect device 380 via a bus 382, such as a PCIe bus. As another example, the peripheral device 390 may be coupled to the interconnect device 380 via a bus 384, such as a PCIe bus. The bus 378 may be configured to communicatively couple the application processor 372, the main memory 376, and the interconnect device 380. The application processor 322 may be configured to execute one or more applications (e.g., one or more software or firmware applications), such as a representative application 374.

The peripheral device 390 may include a connectivity device that is configured to transmit (via wired or wireless communication) with another device. The peripheral device 390 may include a transceiver 392, a peripheral memory 398, and a peripheral controller 394. The transceiver 392 may include a transmitter, a receiver, or both. The transceiver 392 may be configured to transmit one or more messages (e.g., data packets) generated by the second electronic device 352 and to receive one or more messages (e.g., data packets) transmitted to the second electronic device 352 by another device, such as the first electronic device 302. The peripheral controller 394 may be configured to maintain a communication protocol stack 396. For example, the peripheral controller 394 may be configured to execute a communication protocol stack application. The communication protocol stack 396 may correspond to a communication protocol (e.g., hypertext transfer protocol (HTTP) or file transfer protocol (FTP)) to be used to transmit data between the second electronic device 352 and another electronic device, such as the first electronic device 302. The peripheral memory 398, such as an SRAM, may be configured to store data, instructions (e.g., firmware or software) that may be executable by the peripheral controller 394, or a combination thereof. For example, software executed by the peripheral controller 396 may be associated with an application, such as a communication protocol stack application associated with the communication protocol stack 396.

During operation, the application processor 322 (e.g., the application 324) of the first electronic device 302 may determine to copy the data 314, such as a data file, from the first electronic device 302 to the second electronic device 352. If a decision is made to transfer the data 314 from the first electronic device 302 to the second electronic device 352, the first electronic device 302 may be referred to a source device and the second electronic device 352 may be referred to as a destination device. To illustrate, the first electronic device 302 (e.g., the application 324) and the second electronic device 352 (e.g., the application 374) may communicate one or more messages back and forth to negotiate copying the data 314 from the first electronic device 302 to the second electronic device 352. The negotiation performed between the first electronic device 302 and the second electronic device 352 may include exchanging information, such as a file ID of the data 314, a size of the data 314, a format of the data 314, etc., and determining one or more connectivity parameters, such as a communication protocol to be used to transfer the data 314 from the first electronic device 302 to the second electronic device, a communication portion identifier, an address of another device to send or receive data, etc. In some implementations, the negotiation may establish a reference identifier (ID), such as a transfer ID, associated with the transfer of the data 314 from the first electronic device 302 to the second electronic device 352.

The first electronic device 302 may configure the peripheral device 340 according to the one or more connectivity parameters. For example, the application processor 322 (e.g., the application 324) may send a first connectivity message to the peripheral device 340 that indicates the communication protocol to be used to transfer the data 314 from the first electronic device 302 to the second electronic device 352. In response to the first connectivity message, the peripheral controller 344 may implement the protocol stack 346. The communication protocol stack 346 may enable the peripheral controller 344 to packetize the data 314 to be communicated to the second electronic device 352.

The application processor 322 may determine a first set of logical addresses (e.g., a set of one or more logical block addresses (LBAs)) corresponding to the data 314 to be communicated to the second electronic device 352. For example, the application processor 322 may execute a file system application that maintains logical addresses corresponding to the storage device 310. In some implementations, the application processor 322 (e.g., the application 324) may generate a transfer ID associated with the data 314 to be transferred from the storage device 310 to the peripheral device 340. The application processor 322 may generate a first message that includes information, such as the first set of logical addresses, the transfer ID, or a combination thereof. The application processor 322 may provide the first message to the storage device 310, the peripheral device 340, or both. For example, the message may include or correspond to the message 176 or the second message 177 of FIG. 1.

In some implementations, the application processor 322 may generate read indicator (e.g., a read message). The read indicator may indicate the task identifier, that a read access operation is to be performed, a source (e.g., the storage device 310) of the data of the read access operation, a destination (e.g., the peripheral device 340) of the data of the read access operation, a source electronic device (e.g., the first electronic device 302), a destination electronic device (e.g., the second electronic device 352), or a combination thereof. In some implementations, the read indicator may be included in the first connectivity message or the first message. In other implementations, the read indicator may be distinct from the first connectivity message and from the first message.

The second electronic device 352 may configure the peripheral device 390 according to the one or more connectivity parameters. For example, the application processor 372 (e.g., the application 374) may send a second connectivity message to the peripheral device 390 that indicates the communication protocol to be used to transfer the data 314 from the first electronic device 302 to the second electronic device 352. In response to the second connectivity message, the peripheral controller 394 may implement the protocol stack 396. The communication protocol stack 396 may enable the peripheral controller 394 to de-packetize the data 314 received from the first electronic device 302.

The application processor 372 may determine a second set of logical addresses (e.g., a set of one or more logical block addresses (LBAs)) corresponding to the data 314 to be received from the first electronic device 302. For example, the application processor 372 may execute a file system application that maintains logical addresses corresponding to the storage device 360. In some implementations, the application processor 372 (e.g., the application 374) may generate a transfer ID associated with the data 314 to be received from the first electronic device 302 and transferred from the peripheral device 390 to the storage device 360. The application processor 372 may generate a second message that includes information, such as the second set of logical addresses, the transfer ID, or a combination thereof. The application processor 372 may provide the message to the storage device 360, the peripheral device 390, or both. For example, the message may include or correspond to the message 276 or the second message (not shown) of FIG. 2.

In some implementations, the application processor 372 may generate write indicator (e.g., a write message). The write indicator may indicate the task ID, that a write access operation is to be performed, a source (e.g., the peripheral device 390) of the data of the write access operation, a destination (e.g., the storage device 360) of the data of the write access operation, a source electronic device (e.g., the first electronic device 302), a destination electronic device (e.g., the second electronic device 352), or a combination thereof. In some implementations, the write indicator may be included in the first connectivity message or the first message. In other implementations, the write indicator may be distinct from the first connectivity message and from the first message.

After the first message has been provided to the storage device 310 and/or the peripheral device 340, and/or after the second message has been provided to the storage device 360 and/or the peripheral device 390, the first electronic device 302 may begin transferring the data 314 to the second electronic device 352. To transfer the data 314 from the first electronic device 302 to the second electronic device 352, the data 314 may be provided from the storage device 310 to the peripheral device 340 via the interconnect device 330. The peripheral device 340 may receive the data 314 and may store the data 314 in the peripheral memory 348. The peripheral controller 344 may process the data 314 according to the communication protocol stack 346 to packetize the data 314 for transmission to the second electronic device 352. After the data 314 is packetized, the peripheral device 360 may transmit the packetized data via the transceiver 342 to the second electronic device 352.

The second electronic device 352 may receive the packetized data 314 via the transceiver 392 of the peripheral device 390. The peripheral controller 394 may de-packetize the packetized data to retrieve the data 314. The peripheral controller 394 may store the data 314 at the peripheral memory 398 prior to sending the data 314 to the storage device 340 via the interconnect device 380. The storage device 340 may receive the data 314 and may store the data to the memory 362.

In some implementations, after the application processor 322 has provided the first message to the storage device 310, the peripheral device 340, or both, one or more components of the chipset 320 may enter a bypass mode (e.g., a transfer bypass mode). The bypass mode may be a standby mode or a low power mode. To illustrate, the application processor 322 and/or the main memory 326 may enter the bypass mode. The one or more components of the chipset 320 may remain in the bypass mode during at least a portion of an amount of time to transfer the data 314 from the storage device 310 to the peripheral device 340. Additionally or alternatively, after the application processor 372 has provided the second message to the storage device 360, the peripheral device 390, or both, one or more components of the chipset 370 may enter a bypass mode (e.g., a transfer bypass mode). To illustrate, the application processor 372 and/or the main memory 376 may enter the bypass mode. The one or more components of the chipset 370 may remain in the bypass mode during at least a portion of an amount of time to transfer the data 314 from the peripheral device 390 to the storage device 360.

After completion of transferring the data 314 at the first electronic device 302 from the storage device 310 to the peripheral device 340, a first notification may be provided to the chipset 320 to cause the one or more components of the chipset 320 to initiate an active mode (e.g., to switch from the bypass mode to the active mode). For example, the peripheral device 340 may generate and send the first notification to the application processor 322. In a particular implementation, prior to the data 314 being transferred from the storage device 310 to the peripheral device 340, the application processor 322 may have sent a lock command to the storage device 310 to lock the data 314 at the storage device 310 to prevent modification to the data 314 while the data 314 is being copied. In this implementation, the application processor 322 may send a release command to the storage device 310 to unlock the data 314 at the storage device 310 in response to the first notification. Alternatively, in some implementations, the application processor 322 may send an erase command to the storage device 310 to erase the data 314 in response to the first notification.

In some implementations, after completion of transferring the data 314 at the second electronic device 352 from the peripheral device 390 to the storage device 360, a second notification may be provided to the chipset 370 to cause the one or more components of the chipset 370 to initiate an active mode (e.g., to switch from the bypass mode to the active mode). For example, the peripheral device 390 may generate and send the second notification to the application processor 372. In some implementations, in response to the second notification, the application processor 372 may confirm that the data 314 is stored at the second set of logical addresses.

Transfer of data between the first electronic device 302 and the second electronic device 153 may therefore be performed by the peripheral devices 340 and 390 implementing the protocol stack (e.g., for file transfer or streaming, such as audio and/or video steaming) and accessing the respective storage devices 310 and 360 while bypassing the application processors 322 and 372. In implementations where the data 314 is streamed to the second electronic device 352, the second electronic device may present the data 314 (e.g., via an audio device/speaker or a video device/display screen) without storing the data 314 to the storage device 360. Although the communication protocol stacks 346 and 396 are described as being implemented at the peripheral devices 340 and 390, in other implementations one or both of the communication protocol stacks 346 and 396 can instead be implemented at the storage device 310 and/or 360. For example, the storage device 310 may packetize the data 314 prior to sending the data 314 to the peripheral device 340.

Figure 4:
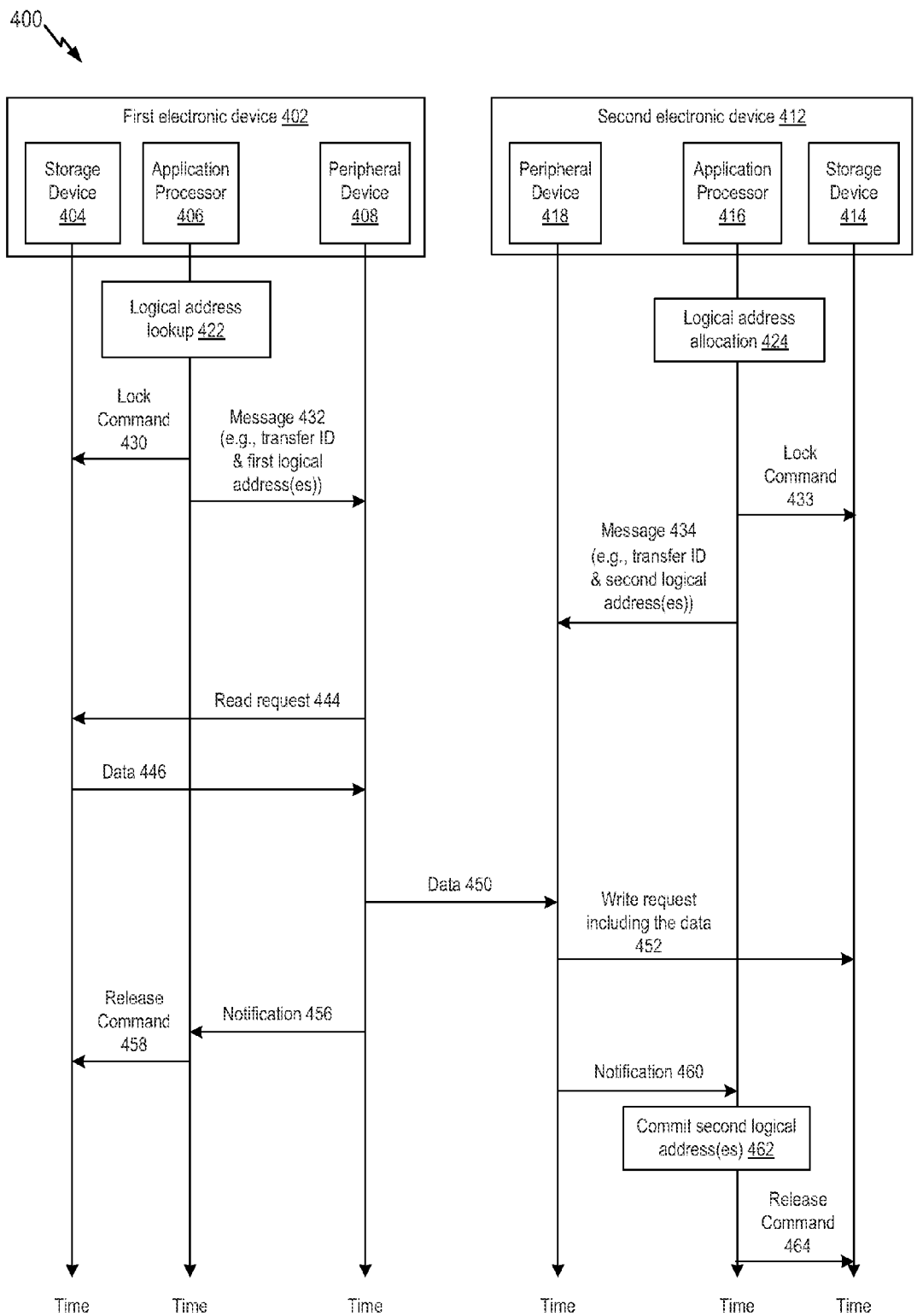
FIG. 4 is a ladder diagram of a first illustrative example of a first method of messaging in a system including a first electronic device configured to transfer data to a second electronic device.

Referring to FIG. 4, an illustrative example of a first method 400 of messaging in a system including a first electronic device 402 configured to transfer data to a second electronic device 412 is shown. The method 400 is illustrated by a ladder diagram. Each of the first electronic device 402 and the second electronic device 412 may include the electronic device 101 of FIGS. 1-2, the first electronic device 302, the second electronic device 352 of FIG. 3, or a combination thereof.

The first electronic device 402 may include a storage device 404, an application processor 406, and a peripheral device 408. The second electronic device 412 may include a storage device 414, an application processor 416, and a peripheral device 418. The first electronic device 402 and the second electronic device 412 may communicate and determine to transfer data from the first electronic device 402 to the second electronic device 412.

After determining to transfer the data, the application processor 406 of the first electronic device 402 may perform an address lookup operation 422 and the application processor 416 of the second electronic device 412 may perform a logical address allocation operation 424. For example, the address lookup operation 422 may identify a first set of one or more logical addresses that correspond to the storage device 404. To illustrate, the first set of the one or more logical addresses may correspond to storage locations of the storage device 404 that store the data to be transferred. The logical address allocation operation 424 may identify a second set of one or more logical addresses that correspond to the storage device 414. To illustrate, the second set of the one or more logical addresses may correspond to storage locations of the storage device 414 that are to store the data to be transferred.

The application processor 406 of the first electronic device 402 may send a lock command 430 to the storage device 404 to lock the data to be transferred to the second electronic device 412. Additionally, the application processor 406 may send a message 432 to the peripheral device 408. For example, the message 432 may include or correspond to the message 276 of FIG. 2. The message 432 may include first information such as a first transfer identifier (ID), an indicator of the first set of one or more logical addresses, and one or more connectivity parameters to enable the first electronic device 402 to participate in data transfer between the first electronic device 402 and the second electronic device 412.

The application processor 416 of the second electronic device 412 may send a lock command 433 to the storage device to lock the storage locations of the storage device 414 that are to store the data to be transferred and may also send a message 434 to the peripheral device 418. For example, the message 434 may include or correspond to the message 176 of FIG. 1. The message 434 may include second information such as a second transfer ID, an indicator of the second set of one or more logical addresses, and one or more connectivity parameters to enable the second electronic device 412 to participate in data transfer between the first electronic device 402 and the second electronic device 412.

After receiving the message 432, the peripheral device 408 may send a read request 444 to the storage device 404. In response to the read request 444, the storage device 404 may perform a memory access operation to retrieve data 446 and may send the data 446 to the peripheral device 408. The read request 444, the data 446, or both may bypass the application processor 406. To illustrate, the application processor 406 may not receive the read request 444 and/or the application processor 406 may not receive the data 446 transferred from the storage device 404 to the peripheral device 408. The peripheral device 408 may receive the data 446 and may send the data 446 to the second electronic device 412 as data 450.

After sending the data 450 to the second electronic device 412, the peripheral device 408 may send a notification 456 to the application processor 406 indicating that the data 446 has been received at the peripheral device 408 and/or has been transferred to the second electronic device 412. In response to receiving the notification 456, the application processor 406 may send a release command 458 to the storage device 404 to unlock the data 446 stored at the storage device 404.

The peripheral device 418 of the second electronic device 412 may receive the data 450 (e.g., the data 446). The peripheral device 418 may send a write request 452 to the storage device 414. The write request 452 may include the data 446 (e.g., the data 450). In response to receiving the data 446 associated with the write request 452, the storage device 414 may write the data 446 to one or more storage locations (of the storage device 414) that correspond to the second set of one or more logical addresses. The write request 452 may bypass the application processor 416. To illustrate, the application processor 416 may not receive the write request 452.

After sending the write request 452 (and the data 446) to the storage device 414, the peripheral device 418 may send a notification 460 to the application processor 416 indicating that the data 446 has been sent to the storage device 414. In response to receiving the notification 460, the application processor 416 may perform a commit operation 462 associated with the second set of one or more logical addresses. The commit operation 462 may cause a file system maintained by the application processor 416 to be updated to reflect that the data 446 corresponds to (e.g., is stored at) the second set of one or more logical addresses. The application processor 416 may send a release command 464 to release the lock at the storage device 414.

Thus, the method 400 provides a method of messaging in a system including the first electronic device 402 configured to transfer data to the second electronic device 412. The first electronic device 402 may identify the first set of logical addresses and may generate the first transfer ID to enable the storage device 404 to transfer the data 446 to the peripheral device 408 (without having to route the data 446 via the application processor 406). By not having to route the data 446 via the application processor 406, an amount of time to transfer the data 446 from the storage device 404 to the peripheral device 408 may be reduced. Additionally, the peripheral device 418 may be enabled to transfer the data 446 to the storage device 414 (without having to route the data 446 via the application processor 416). By not having to route the data 446 via the application processor 416, an amount of time to transfer the data 446 from the storage device 414 to the peripheral device 418 may be reduced.

Figure 5:
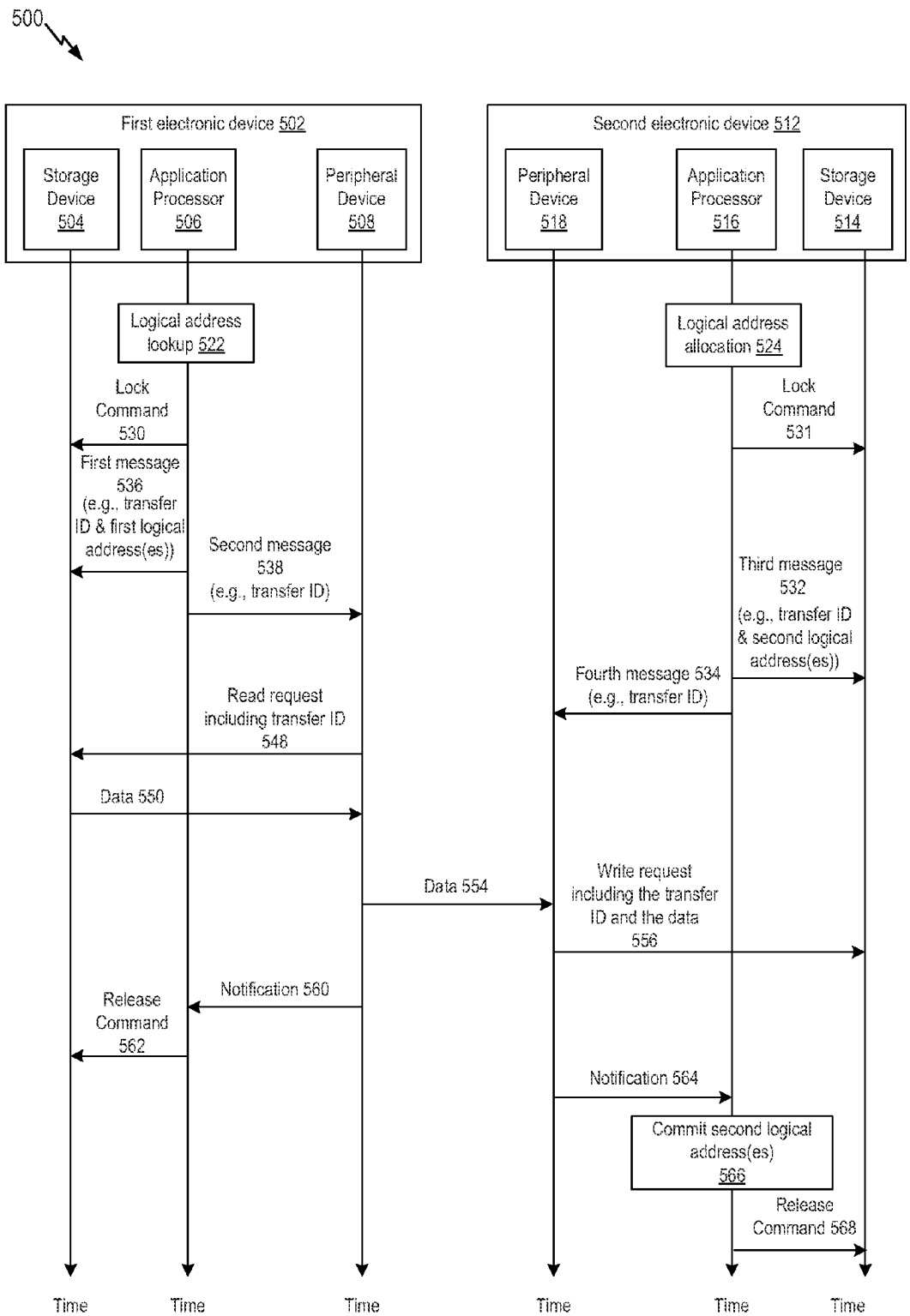
FIG. 5 is a ladder diagram of a second illustrative example of a second method of messaging in a system including a first electronic device configured to transfer data to a second electronic device.

Referring to FIG. 5, an illustrative example of a second method 500 of messaging in a system including a first electronic device 502 configured to transfer data to a second electronic device 512 is shown. The method 500 is illustrated by a ladder diagram. Each of the first electronic device 502 and the second electronic device 512 may include the electronic device 101 of FIGS. 1-2, the first electronic device 302, the second electronic device 352 of FIG. 3, or a combination thereof.

The first electronic device 502 may include a storage device 504, an application processor 506, and a peripheral device 508. The second electronic device 512 may include a storage device 514, an application processor 516, and a peripheral device 518. The first electronic device 502 and the second electronic device 512 may communicate and determine to transfer data from the first electronic devices 502 to the second electronic device 512.

After deciding to transfer the data, the application processor 506 of the first electronic device 502 may perform an address lookup operation 522 and the application processor 516 of the second electronic device 512 may perform a logical address allocation operation 524. For example, the logical address lookup operation 522 may identify a first set of one or more logical addresses that correspond to the storage device 504. To illustrate, the first set of the one or more logical addresses may correspond to storage locations of the storage device 504 that store the data to be transferred. The logical address allocation operation 524 may identify a second set of one or more logical addresses that correspond to the storage device 514. To illustrate, the second set of the one or more logical addresses may correspond to storage locations of the storage device 514 that are to store the data to be transferred.

The application processor 506 of the first electronic device 502 may send a lock command 530 to the storage device 504 and the application processor 516 may send a lock command 531 to the storage device 514. Additionally, the application processor 506 may send a first message 536 to the storage device 504. For example, the first message 536 may include or correspond to the message 276 of FIG. 2. The first message 536 may include first information such as a first transfer identifier (ID) and an indicator of the first set of one or more logical addresses. The application processor 506 may send a second message 538 to the peripheral device 508. The second message 538 may include first transfer ID and may include one or more connectivity parameters to enable the first electronic device 502 to participate in data transfer between the first electronic device 502 and the second electronic device 512.

The application processor 516 may send a third message 532 to the storage device 514. For example, the third message 532 may include or correspond to the message 176 of FIG. 1. The third message 532 may include second information such as a second transfer ID and an indicator of the second set of one or more logical addresses. The application processor 516 may send a fourth message 534 to the peripheral device 518. For example, the fourth message 534 may include or correspond to the second message 178 of FIG. 1. The fourth message 534 may include the second transfer ID and may include one or more connectivity parameters to enable the second electronic device 512 to participate in data transfer between the first electronic device 502 and the second electronic device 512.

After the application processor 506 sends the second message 538, the peripheral device 508 may send a read request 548 to the storage device 504. The read request 548 may include the first transfer ID. In response to the read request 548, the storage device 504 may perform a memory access operation to retrieve data 550 and may send the data 550 to the peripheral device 508. The read request 548, the data 550, or both may bypass the application processor 506. To illustrate, the application processor 506 may not receive the read request 548 and/or the application processor 506 may not receive the data 550 transferred from the storage device 504 to the peripheral device 508. The peripheral device 508 may receive the data 550 and may send the data 550 to the second electronic device 512 as data 554.

After sending the data 554 to the second electronic device 512, the peripheral device 508 may send a notification 560 to the application processor 506 indicating that the data 550 has been received at the peripheral device 508 and/or has been transferred to the second electronic device 512. In response to receiving the notification 560, the application processor 506 may send a release command 562 to the storage device 504 to release the data 550.

The peripheral device 518 of the second electronic device 512 may receive the data 554 (e.g., the data 550). The peripheral device 518 may send a write request 556 to the storage device 514. The write request 556 may include the second transfer ID and the data 550 (e.g., the data 554). In response to receiving the data 550 associated with the write request 556, the storage device 514 may write the data 550 to one or more storage locations (of the storage device 514) that correspond to the second set of one or more logical addresses. The write request 556 may bypass the application processor 516. To illustrate, the application processor 516 may not receive the write request 556.

After sending the write request 556 (and the data 550) to the storage device 514, the peripheral device 518 may send a notification 564 to the application processor 516 indicating that the data 550 has been sent to the storage device 514. In response to receiving the notification 564, the application processor 516 may perform a commit operation 566 associated with the second set of one or more logical addresses. The commit operation 566 may cause a file system maintained by the application processor 516 to be updated to reflect that the data 550 corresponds to (e.g., is stored at) the second set of one or more logical addresses. The application processor 516 may also send a release command 568 to the storage device 514.

Thus, the method 500 provides a method of messaging in a system including the first electronic device 502 configured to transfer data to the second electronic device 512. The storage device 504 may be enabled to transfer the data 550 to the peripheral device 508 (without having to route the data 550 via the application processor 506). By not having to route the data 550 via the application processor 506, an amount of time to transfer the data 550 from the storage device 504 to the peripheral device 508 may be reduced. Additionally, the peripheral device 518 may be enabled to transfer the data 550 to the storage device 514 (without having to route the data 550 via the application processor 516). By not having to route the data 550 via the application processor 516, an amount of time to transfer the data 550 from the storage device 514 to the peripheral device 518 may be reduced.

Figure 6:
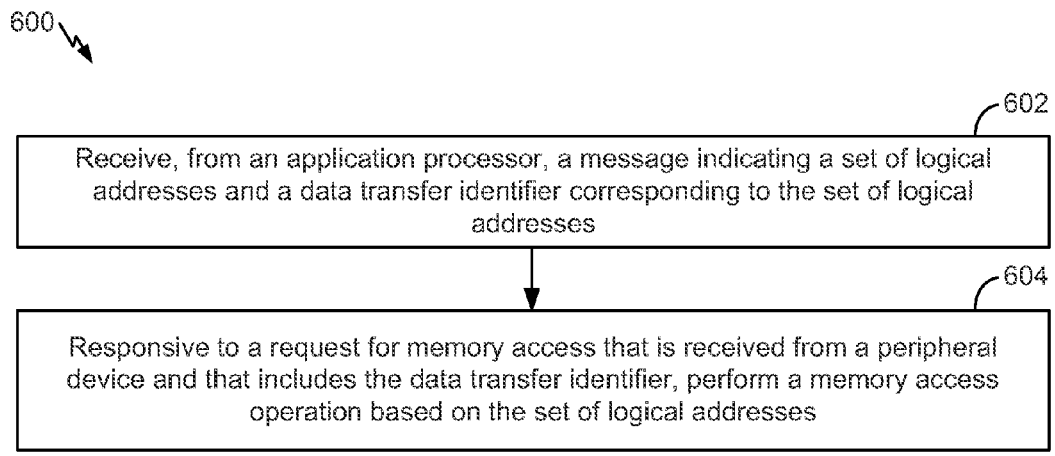
FIG. 6 is a flowchart of a particular illustrative example of a method of operating a data storage device.

Referring to FIG. 6, a particular illustrative example of a method of operating a data storage device is depicted and generally designated 600. The method 600 may be performed at the storage device 102 of FIG. 1, the storage device 310, the storage device 360 of FIG. 3, the storage device 404, the storage device 414 of FIG. 4, the storage device 504, the storage device 514 of FIG. 5, or a combination thereof, as illustrative, non-limiting examples.

The method 600 includes receiving, from an application processor, a message indicating a set of logical addresses and a data transfer identifier corresponding to the set of logical addresses, at 602. The method 600 further includes, responsive to a request for memory access that is received from a peripheral device and that includes the data identifier, performing a memory access operation based on the set of logical addresses, at 604. The peripheral device may include a transceiver, such as the transceiver 342 or the transceiver 392 of FIG. 3.

The data may be sent to the peripheral device via an interconnect device, such as the interconnect device 120 of FIG. 1, the interconnect device 330, or the interconnect device 380 of FIG. 3. The interconnect device may include a root complex device. A memory controller of the data storage device may be coupled to the application processor and to the peripheral device via the interconnect device. To illustrate, the memory controller may be coupled to the interconnect device via a PCIe bus.

In some implementations, the message includes a first logical address of the set of logical addresses and a data transfer identifier corresponding to the set of logical addresses. The method 600 may also include storing the first logical address at a second memory of the memory controller and receiving an access request (e.g., a read request or a write request) form the peripheral device. The access request may include the data transfer identifier. In response to detecting the data transfer identifier included in the access request, the first logical address stored at the second memory may be identified. In some implementations, the access request may include an offset value. The offset value may be added to the first logical address to determine a second logical address of the set of logical addresses. The memory access operation may be performed on at least a portion of the data based on the second logical address. For example, data may be read from or written to the memory (of the data storage device) based on the second logical address.

In a particular implementation, the set of logical addresses corresponds to data stored in the memory and the request may include a request for read access to the memory. In this implementation, performing the memory access operation may include reading the data from the memory and sending the data to the peripheral device. Alternatively, in another particular implementation, the set of logical addresses may correspond to one or more locations in the memory allocated for storage of data and the request may include a request for write access to the memory. In this implementation, performing the memory access operation may include receiving the data from the peripheral device and storing the data into the one or more locations.

In some implementations, the data storage device may include a memory controller that is configured to receive a lock command from the application processor prior to receiving the request and to enable execution of the request received from the peripheral device in response to the lock command. Additionally or alternatively, the memory controller may be configured to receive a release command from the application processor after performing the memory access operation.

Thus, the method 600 provides a method of operating a data storage device. The data storage device may be configured to send data to or receive data from a peripheral device (without having to route the data via the application processor). By not having to route the data via the application processor, an amount of time to transfer the data from the data storage device to the peripheral device may be reduced.

Figure 7:
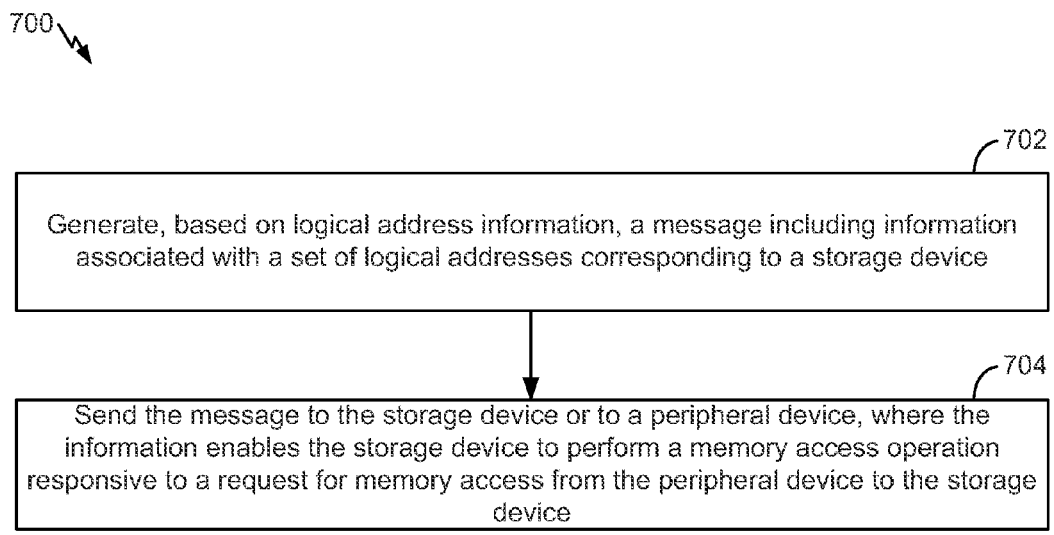
FIG. 7 is a flowchart of a particular illustrative example of a method of operating a chipset including an application processor.

Referring to FIG. 7, a particular illustrative example of a first illustrative example of a method of operating a chipset including an application processor is depicted and generally designated 700. The method 700 may be performed at the chipset 170 (e.g., the application processor 174) of FIG. 1, the chipset 320 (e.g., the application processor 322), the chipset 370 (e.g., the application processor 372) of FIG. 3, the application processor 406, the application processor 416 of FIG. 4, the application processor 506, the application processor 516 of FIG. 5, or a combination thereof, as illustrative, non-limiting examples.

The method 700 includes generating, based on logical address information, a message including information associated with a set of logical addresses corresponding to a storage device, at 702. In some implementations, the message may include a data transfer identifier and at least one logical address of the set of logical addresses. The method 700 further includes sending the message to the storage device or to a peripheral device, where the information enables the storage device to perform a memory access operation responsive to a request for memory access from the peripheral device to the storage device, at 704.

In some implementations, the chipset may include an interconnect device. The storage device may be coupled to the interconnect device via a first peripheral component interconnect express (PCIe) bus and the peripheral device may be coupled to the interconnect device via a second PCIe bus. The application processor is coupled to the storage device and to the peripheral device via the interconnect device. Additionally or alternatively, the chipset may include a system bus that is coupled to the main memory, the application processor, and the interconnect device.

Thus, the method 700 provides of a method of operating a chipset including an application processor. The application processor may be configured to enable the data storage device to send data to or receive data from a peripheral device (without having the data be routed via the application processor). By not having to route the data via the application processor, an amount of time to transfer the data between the data storage device and the peripheral device may be reduced.

Figure 8:
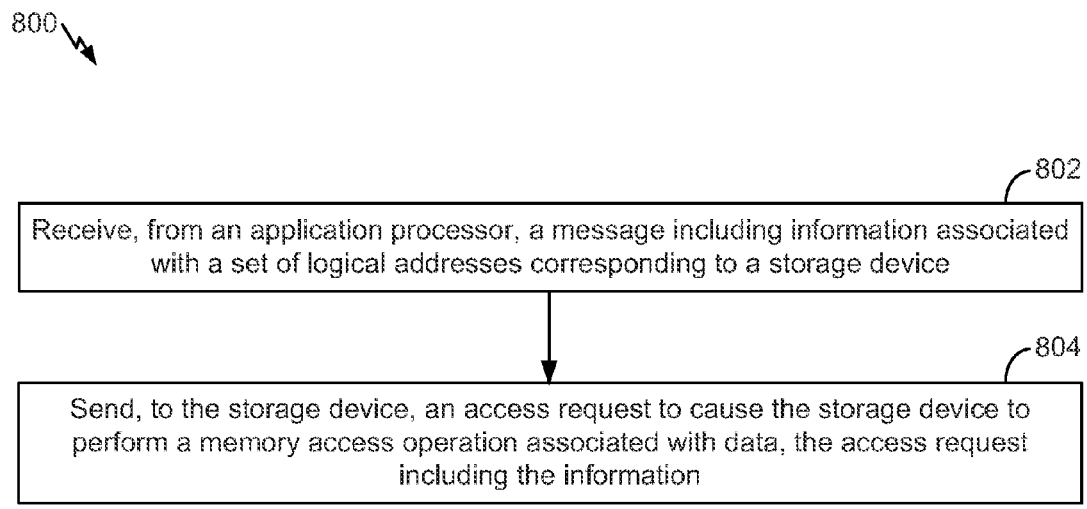
FIG. 8 is a flowchart of a particular illustrative example of a method of operating a peripheral device.

Referring to FIG. 8, a particular illustrative example of a method of operating a peripheral device is depicted and generally designated 800. The method 800 may be performed at the peripheral device 150 of FIG. 1, the peripheral device 340, the peripheral device 390 of FIG. 3, the peripheral device 408, the peripheral device 418 of FIG. 4, the peripheral device 508, the peripheral device 518 of FIG. 5, or a combination thereof, as illustrative, non-limiting examples. In some implementations, the peripheral controller may configured to send the access request to the storage device via the interconnect device.

The method 800 includes receiving, from an application processor, a message including information associated with a set of logical addresses corresponding to a storage device, at 802. In some implementations, the information includes at least one logical address of the set of logical addresses. Additionally or alternatively, the information may include a data transfer identifier corresponding to the set of logical addresses.

The method 800 further includes sending, to the storage device, an access request to cause the storage device to perform a memory access operation associated with data, the access request including the information, at 804. The access request may include a read request or a write request. Additionally or alternatively, the access request may include a data transfer identifier corresponding to the set of logical address, at least one logical address of the set of logical addresses, an offset value, or a combination thereof. In some implementations, the peripheral controller may be coupled to the application processor and to the storage device via an interconnect device.

Thus, the method 800 provides a method of operating a peripheral device. The peripheral device may be configured to send data to or receive data from a storage device (without having to route the data via the application processor). By not having to route the data via the application processor, an amount of time to transfer the data between the data storage device and the peripheral device may be reduced.

The method 400 of FIG. 4, the method 500 of FIG. 5, the method 600 of FIG. 6, the method 700 of FIG. 7, and/or the method 800 of FIG. 8 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 400 of FIG. 4, the method 500 of FIG. 5, the method 600 of FIG. 6, the method 700 of FIG. 7, and/or the method 800 of FIG. 8 can be initiated or controlled by one or more processors, such as one or more processors included in or coupled to a controller or a memory of the electronic device 101 (e.g., the storage device 102, the chipset 170, or the peripheral device 150) of FIG. 1. A controller configured to perform the method 400 of FIG. 4, the method 500 of FIG. 5, the method 600 of FIG. 6, the method 700 of FIG. 7, and/or the method 800 of FIG. 8 may be able to enable a transfer of data. As an example, one or more of the methods of FIGS. 4-8, individually or in combination, may be performed by the memory controller 130, the application processor 174, or the peripheral controller 154 of FIG. 1. To illustrate, a portion of one of the methods FIGS. 4-8 may be combined with a second portion of one of the methods of FIGS. 4-8. Additionally, one or more operations described with reference to the FIGS. 4-8 may be optional, may be performed at least partially concurrently, and/or may be performed in a different order than shown or described.

Although various components of the electronic device 101 of FIGS. 1 and 2, the first electronic device 302, or the second electronic device 352 of FIG. 3 are depicted herein as block components and described in general terms, such components may include one or more physical components, such as hardware controllers, one or more microprocessors, state machines, logic circuits, one or more other structures, other circuits, or a combination thereof configured to enable the various components to perform operations described herein. Components described herein may be operationally coupled to one another using one or more nodes, one or more buses (e.g., data buses and/or control buses), one or more other structures, or a combination thereof. One or more aspects of the various components may be implemented using a microprocessor or microcontroller programmed to perform operations described herein, such as one or more operations of the method 400 of FIG. 4, the method 500 of FIG. 5, the method 600 of FIG. 6, the method 700 of FIG. 7, and/or the method 800 of FIG. 8.

Alternatively or in addition, one or more aspects of the electronic device 101 of FIGS. 1 and 2, the first electronic device 302, or the second electronic device 352 of FIG. 3 may be implemented using a microprocessor or microcontroller programmed (e.g., by executing instructions) to perform operations described herein, such as one or more operations of the method 400 of FIG. 4, the method 500 of FIG. 5, the method 600 of FIG. 6, the method 700 of FIG. 7, and/or the method 800 of FIG. 8, as described further herein. As an illustrative, non-limiting example, the storage device 102 includes a processor executing instructions (e.g., firmware) retrieved from the memory 104. Alternatively or in addition, instructions that are executed by the processor may be retrieved from a separate memory location that is not part of the memory 104, such as at a read-only memory (ROM).

In some implementations, each of the storage device 102, the chipset 170, and/or the peripheral device 150 of FIG. 1 may include a processor executing instructions that are stored at a corresponding memory, such as a non-volatile memory of the storage device 102, the chipset 170, or the peripheral device 150 of FIG. 1. Alternatively or additionally, executable instructions that are executed by the processor may be stored at a separate memory location that is not part of the non-volatile memory, such as at a read-only memory (ROM) of the storage device 102, the chipset 170, and/or the peripheral device 170 of FIG. 1.

For example, a computer readable storage device may store instructions that, when executed by a processor in a data storage device that is coupled to an application processor and to a peripheral device, cause the processor of the data storage device to perform operations including receiving, from the application processor, a message indicating a set of logical addresses and a data transfer identifier corresponding to the set of logical addresses. The operations may further include, responsive to a request for memory access that is received from the peripheral device and that includes the data transfer identifier, performing a memory access operation based on the set of logical addresses.

The memory 104, the memory 134, the main memory 186, the peripheral memory 160 of FIG. 1, the memory 312, the memory 318, the main memory 326, the peripheral memory 348, the memory 362, the main memory 376, or the peripheral memory 394 of FIG. 3 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof.

Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the examples described herein are intended to provide a general understanding of the various aspects of the disclosure. Other implementations may be utilized and derived from the disclosure, such that structural and logical substitutions and changes may be made without departing from the scope of the disclosure. This disclosure is intended to cover any and all subsequent adaptations or variations of various implementations. Those of skill in the art will recognize that such modifications are within the scope of the present disclosure.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
    a memory; and
    a memory controller coupled to the memory, the memory controller having an interface to an application processor and a peripheral device, wherein the memory controller is configured to:
        receive, from the application processor, a message indicating a set of logical addresses and a data transfer identifier corresponding to the set of logical addresses; and
        responsive to a request for memory access, wherein the request includes the data transfer identifier and is received from the peripheral device, perform a memory access operation based on the set of logical addresses.

2. The data storage device of claim 1, wherein the set of logical addresses corresponds to data stored in the memory, wherein the request includes a request for read access to the memory, and wherein performing the memory access operation includes reading the data from the memory and sending the data to the peripheral device.

3. The data storage device of claim 2, wherein the memory controller is coupled to the application processor and to the peripheral device via an interconnect device, and wherein the data is sent to the peripheral device via the interconnect device.

4. The data storage device of claim 3, wherein the interconnect device comprises a root complex device, and wherein the memory controller is coupled to the interconnect device via a peripheral component interconnect express (PCIe) bus.

5. The data storage device of claim 1, wherein the set of logical addresses corresponds to one or more locations in the memory allocated for storage of data, wherein the request includes a request for write access to the memory, and wherein performing the memory access operation includes receiving the data from the peripheral device and storing the data into the one or more locations.

6. The data storage device of claim 1, wherein the memory controller is further configured to receive a lock command from the application processor prior to receiving the request and to enable execution of the request received from the peripheral device in response to the lock command, and wherein the memory controller is further configured to receive a release command from the application processor after performing the memory access operation.

7. A method comprising:
in a data storage device coupled to an application processor and to a peripheral device, the data storage device including a memory and a memory controller coupled to the memory, performing:
receiving, from the application processor, a message indicating a set of logical addresses and a data transfer identifier corresponding to the set of logical addresses; and
responsive to a request for memory access that is received from the peripheral device and that includes the data transfer identifier, performing a memory access operation based on the set of logical addresses.

8. The method of claim 7, wherein the set of logical addresses corresponds to data stored in the memory, wherein the request includes a read request for read access to the memory, and wherein performing the memory access operation includes reading the data from the memory and sending the data to the peripheral device.

9. The method of claim 8, further comprising:
storing a first logical address of the set of logical addresses at a second memory of the memory controller;
detecting the data transfer identifier in the request; and
identifying the first logical address stored at the second memory in response to detecting the data transfer identifier in the read request.

10. The method of claim 9, wherein the request includes an offset value, and further comprising:
adding the offset value to the first logical address to determine a second logical address of the set of logical addresses; and
reading at least a portion of the data from the memory based on the second logical address.

11. A computer readable storage device storing instructions that, when executed by a processor in a data storage device that is coupled to an application processor and to a peripheral device, cause the processor of the data storage device to perform operations including:
receiving, from the application processor, a message indicating a set of logical addresses and a data transfer identifier corresponding to the set of logical addresses; and
responsive to a request for memory access that is received from the peripheral device and that includes the data transfer identifier, performing a memory access operation based on the set of logical addresses.

12. An apparatus comprising:
means for storing logical address information; and
means for receiving the logical address information from the means for storing, for generating, based on the logical address information, a message including information associated with a set of logical addresses corresponding to a storage device and indicating a data transfer identifier, and for sending the message to the storage device, wherein the information enables the storage device to perform a memory access operation responsive to a request for memory access from a peripheral device to the storage device, the request including the data transfer identifier.

13. A peripheral device comprising:
a peripheral controller having an interface to an application processor and a storage device, the peripheral controller configured to:
receive, from the application processor, a message including information associated with a set of logical addresses corresponding to the storage device and connectivity parameters to enable communication with a remote device; and
send, to the storage device, an access request to cause the storage device to perform a memory access operation associated with data, the access request including the information; and
a peripheral memory coupled to the peripheral controller and configured to store the data.

14. The peripheral device of claim 13, wherein the information comprises at least one logical address of the set of logical addresses.

15. The peripheral device of claim 13 wherein the information comprises a data transfer identifier corresponding to the set of logical addresses.

16. The peripheral device of claim 13, wherein the information comprises one or more connectivity parameters to enable autonomous communication with the remote device.

17. The peripheral device of claim 13, wherein the access request includes a data transfer identifier corresponding to the set of logical addresses, at least one logical address of the set of logical addresses, an offset value, or a combination thereof.

18. The peripheral device of claim 13, wherein the access request comprises a read request or a write request.

19. The peripheral device of claim 13, wherein the peripheral controller is coupled to the application processor and to the storage device via an interconnect device, and wherein the peripheral controller is further configured to send the access request to the storage device via the interconnect device.

20. The peripheral device of claim 13, further comprising a transceiver coupled to the peripheral controller.

21. The data storage device of claim 1, further comprising a second memory of the memory controller, wherein the memory controller is further configured to store a first logical address of the set of logical addresses at the second memory.

22. The data storage device of claim 1, further comprising a second memory of the memory controller, wherein the memory controller is further configured to identify a first logical address stored at the second memory in response to detecting the data transfer identifier in the request, the first logical address included in the set of logical addresses.

23. The method of claim 7, further comprising:
prior to receiving the request, receiving a lock command from the application processor; and
executing the request received from the peripheral device in response to the lock command.

24. The method of claim 7, further comprising receiving a release command from the application processor after performing the memory access operation.

25. The computer readable storage device of claim 11, wherein the operations further include:

adding an offset value indicated by the request to a first logical address of the set of logical addresses to generate a second logical address; and reading at least a portion of data from the memory based on the second logical address, the data corresponding to the set of logical addresses.

26. The apparatus of claim 12, wherein the means for receiving the logical address information is configured to operate during the memory access operation based on one or more of a standby mode or a low-power mode.

* * * * *